United States Patent
Cazzoli (10) Patent No.: US 10,577,008 B2
(45) Date of Patent: Mar. 3, 2020

(54) SYSTEMS AND METHODS FOR OPERATOR HAND POSITION ADJUSTMENT FOR AIRBAG DEPLOYMENT

(71) Applicant: Toyota Research Institute, Inc., Los Altos, CA (US)

(72) Inventor: James Cazzoli, Mahopac, NY (US)

(73) Assignee: Toyota Research Institute, Inc., Los Altos, CA (US)

( * ) Notice: Subject to any disclaimer, the term of this patent is extended or adjusted under 35 U.S.C. 154(b) by 25 days.

(21) Appl. No.: 15/787,866

(22) Filed: Oct. 19, 2017

(65) Prior Publication Data

US 2019/0118849 A1  Apr. 25, 2019

(51) Int. Cl.
| | |
|---|---|
| *B62D 1/04* | (2006.01) |
| *B60N 2/00* | (2006.01) |
| *B60R 21/20* | (2011.01) |
| *B60R 21/01* | (2006.01) |
| *B62D 1/19* | (2006.01) |
| *B60R 21/203* | (2006.01) |
| *B60R 21/015* | (2006.01) |
| *B60R 21/0134* | (2006.01) |
| *B60R 21/013* | (2006.01) |

(52) U.S. Cl.
CPC ............ *B62D 1/046* (2013.01); *B60N 2/002* (2013.01); *B60R 21/013* (2013.01); *B60R 21/0134* (2013.01); *B60R 21/01516* (2014.10); *B60R 21/01552* (2014.10); *B60R 21/203* (2013.01); *B62D 1/197* (2013.01); *B60R 2021/01013* (2013.01); *B60R 2021/01286* (2013.01)

(58) Field of Classification Search
CPC ............ B62D 1/046; B60R 21/01516; B60R 21/0134; B60R 21/203; B60R 21/01552; B60R 2021/01286; B60R 2021/01013; B60N 2/002

See application file for complete search history.

(56) References Cited

U.S. PATENT DOCUMENTS

| | | | |
|---|---|---|---|
| 7,147,246 B2 | 12/2006 | Breed et al. | |
| 7,164,117 B2 | 1/2007 | Breed et al. | |
| 8,564,424 B2 | 10/2013 | Evarts et al. | |
| 8,991,857 B2 | 3/2015 | Jacqmarcq et al. | |
| 9,290,147 B2 | 3/2016 | Mazur et al. | |
| 9,475,443 B2 | 10/2016 | Peterson et al. | |
| 2007/0057781 A1* | 3/2007 | Breed .................... | B60K 35/00 340/457.1 |

(Continued)

FOREIGN PATENT DOCUMENTS

KR     20030083991 A  * 11/2003

*Primary Examiner* — Rodney A Butler
(74) *Attorney, Agent, or Firm* — Christopher G. Darrow; Darrow Mustafa PC (57) ABSTRACT

System, methods, and other embodiments described herein relate to improving deployment of an airbag by controlling a steering wheel in a vehicle. In one embodiment, a method includes identifying at least a hand position for one or more hands of the operator on the steering wheel using orientation data acquired from at least one sensor of the vehicle. The method includes determining, as a function of at least the hand position, a mitigation action associated with deploying the airbag. The method includes, in response to detecting that deployment of the airbag is imminent, controlling the steering wheel according to the mitigation action.

17 Claims, 6 Drawing Sheets

(56) References Cited

U.S. PATENT DOCUMENTS

| | | | |
|---|---|---|---|
| 2007/0228704 A1 | 10/2007 | Cuddihy et al. | |
| 2014/0054880 A1* | 2/2014 | Feinstein | B60R 21/203 |
| | | | 280/731 |
| 2015/0032334 A1* | 1/2015 | Jang | B62D 1/046 |
| | | | 701/42 |
| 2015/0274106 A1* | 10/2015 | Lorenz | B60R 21/0134 |
| | | | 280/731 |
| 2016/0375910 A1 | 12/2016 | McMillen et al. | |
| 2017/0113641 A1* | 4/2017 | Thieberger | B60R 1/00 |

* cited by examiner

SYSTEMS AND METHODS FOR OPERATOR HAND POSITION ADJUSTMENT FOR AIRBAG DEPLOYMENT

TECHNICAL FIELD

The subject matter described herein relates in general to systems for improving safety in relation to airbags and, more particularly, to selectively adjusting hand position of an operator by automatically rotating a steering wheel prior to deploying an airbag.

BACKGROUND

Airbags are vehicle safety devices that inflate at a rapid rate when a collision or other impact occurs and are generally designed to provide a soft cushioning restraint to prevent injury to an operator or other occupant situated near the airbag. In modern vehicles, airbags can be placed throughout a passenger compartment. However, airbags are most commonly placed within a steering wheel. While placing an airbag within a steering wheel is an effective means of preventing serious injury, the airbag itself can cause secondary injuries to an operator. For example, if the operator positions his/her hands in a deployment path (e.g., hands at 12 o'clock) of the airbag, then the airbag can injure the hands of the operator when rapidly inflating. Consequently, while airbags are effective at preventing serious injury, airbags can also cause secondary injuries to the operator when the operator is not positioned appropriately.

SUMMARY

Example systems and methods are disclosed herein that relate to a manner of selectively adjusting the hand position of an operator for airbag deployment by controlling movement of the steering wheel. For example, improved safety for the deployment of an airbag can be achieved using a deployment system that monitors the hand position of the operator to capture placement of the hands of the operator on the steering wheel. In one embodiment, the disclosed deployment system can analyze sensor data (e.g., camera images) to identify where the operator's hands are located on the steering wheel and by extension whether one or more of the operator's hands are not located on the steering wheel. In further aspects, the deployment system may also identify positioning of arms, the head, and so forth to provide a more robust determination of an orientation of the operator.

In either case, the deployment system, in one embodiment, uses the information about the placement of the operator's hands to identify a particular mitigation action to execute in the event of deployment of the airbag. In general, the mitigation action is implemented to avoid injury to the operator from the deployment of the airbag. Consider that when the operator's hands are located in certain locations on the steering wheel, injuries are more likely to occur from the deployment of the airbag. As one example, when the operator's hands are located at the 12 o'clock position the airbag is likely to cause injuries to the hands/arms/head when deploying. Thus, the deployment system can identify this or other orientations of the operator for which injury is likely and execute the mitigation action to improve hand placement on the steering wheel. In this way, the deployment system can facilitate avoiding potentially dangerous hand placements by the operator.

In one embodiment, a deployment system for improving deployment of an airbag by controlling a steering wheel in a vehicle is disclosed. The deployment system includes one or more processors and a memory that is communicably coupled to the one or more processors. The memory stores a monitoring module including instructions that when executed by the one or more processors cause the one or more processors to identify at least a hand position for one or more hands of the operator on the steering wheel using orientation data acquired from at least one sensor of the vehicle. The memory stores a steering module that includes instructions that when executed by the one or more processors cause the one or more processors to determine, as a function of at least the hand position, a mitigation action associated with deploying the airbag. The steering module further includes instructions to, in response to detecting that deployment of the airbag is imminent, control the steering wheel according to the mitigation action.

In one embodiment, a non-transitory computer-readable medium for improving deployment of an airbag by controlling a steering wheel in a vehicle is disclosed. The non-transitory computer-readable medium stores instructions that when executed by one or more processors cause the one or more processors to perform the disclosed functions. The instructions include instructions to identify at least a hand position for one or more hands of the operator on the steering wheel using orientation data acquired from at least one sensor of the vehicle. The instructions include instructions to determine, as a function of at least the hand position, a mitigation action associated with deploying the airbag. The instructions including instructions to in response to detecting that deployment of the airbag is imminent, control the steering wheel according to the mitigation action.

In one embodiment, a method of improving deployment of an airbag by controlling a steering wheel in a vehicle is disclosed. The method includes identifying at least a hand position for one or more hands of the operator on the steering wheel using orientation data acquired from at least one sensor of the vehicle. The method includes determining, as a function of at least the hand position, a mitigation action associated with deploying the airbag. The method includes, in response to detecting that deployment of the airbag is imminent, controlling the steering wheel according to the mitigation action.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with selectively controlling the movement of a steering wheel within a vehicle to improve safety for deployment of an airbag are disclosed herein. As mentioned previously, when a vehicle deploys an airbag, injuries can result to an operator. For example, when the operator is positioned in a particular orientation next to a deploying airbag, the airbag can deflect hands/arms of the operator causing injuries. In particular, when the operator places hands on the steering wheel in certain orientations (e.g., at 12 o'clock), the deploying airbag may deflect the operator's hands upward or into the operator's head. Thus, while airbags generally protect the operator from serious injury during collisions, the airbag may also cause secondary injuries from deployment.

Therefore, in one embodiment, a deployment system improves safety for the operator through monitoring an orientation (e.g., hand position, arm position, etc.) of the operator in relation to the steering wheel and an area in which the airbag deploys, and selectively rotating the steering wheel to avoid potentially dangerous hand positions or other body orientations of the operator during deployment of the airbag. Consequently, in one embodiment, the disclosed deployment system can analyze orientation/sensor data (e.g., camera images) to identify a general position of the operator's hands, arms, etc.

The deployment system uses, in one embodiment, the information about the placement of the operator's hands to identify a particular mitigation action to execute when the airbag is deployed. In general, the mitigation action is implemented to avoid injury to the operator from the deployment of the airbag. Thus, the deployment system selects the mitigation action according to, for example, the hand position such that the deployment system can rotate the steering wheel to facilitate movement of the operator's hands out of a deployment area or lock the steering wheel to maintain the hand position in a present location that is out of the deployment area. The deployment system can identify potentially dangerous orientations of the operator for which injury is likely and execute the mitigation action to improve hand placement and/or general body placement in relation to the steering wheel. In this way, the deployment system can facilitate avoiding injury to the operator from deployment of the airbag.

Figure 1:
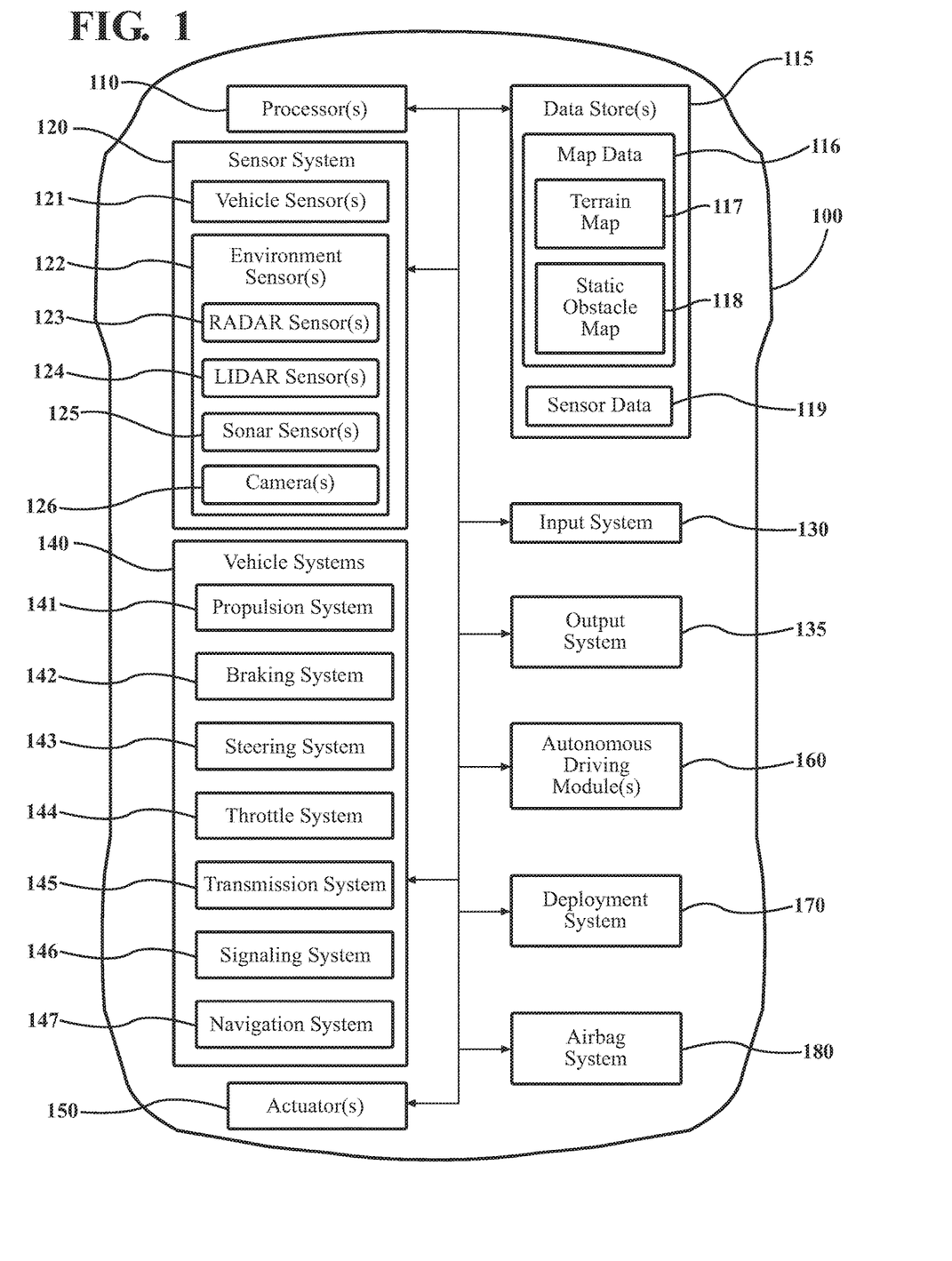
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that, for example, includes airbags and benefits from the systems and methods as discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a deployment system 170 that is implemented to perform methods and other functions as disclosed herein relating to monitoring an orientation of an operator of the vehicle 100 and selectively controlling the steering wheel to adjust the positioning of the operator. The noted functions and methods will become more apparent with a further discussion of the figures.

Moreover, the vehicle 100 is illustrated as including an airbag system 180. In one embodiment, the airbag system 180 includes an airbag that is integrated with a steering wheel of the vehicle 100. That is, the steering wheel, which is provided for manually maneuvering the vehicle 100, includes at least a single airbag integrated therein in order to provide for operator safety during a collision or other impact. In one embodiment, the airbag is located within a center region of the steering wheel. While the airbag within the steering wheel is the general focus of this discussion, it should be appreciated that the general spirit of this disclosure can also apply to additional airbags that may be included within the vehicle 100 such as a front passenger airbag that is selectively controlled according to a position of a passenger, and so on.

In either case, the airbag within the steering wheel is, for example, either directly or indirectly connected with sensors located in the vehicle 100 that detect an occurrence of the collision and thus cause the airbag to deploy in reaction thereto. In further aspects, the vehicle 100 can include various autonomous logic and associated sensors that function to detect obstacles in the surrounding environment and predict impacts therewith. Thus, in the noted instances of inclusion with autonomous functionality, the autonomous logic may control deployment of the airbag. In either case, the noted functions and methods associated with deploying the airbag will be discussed further in relation to the subsequent figures.

Figure 2:
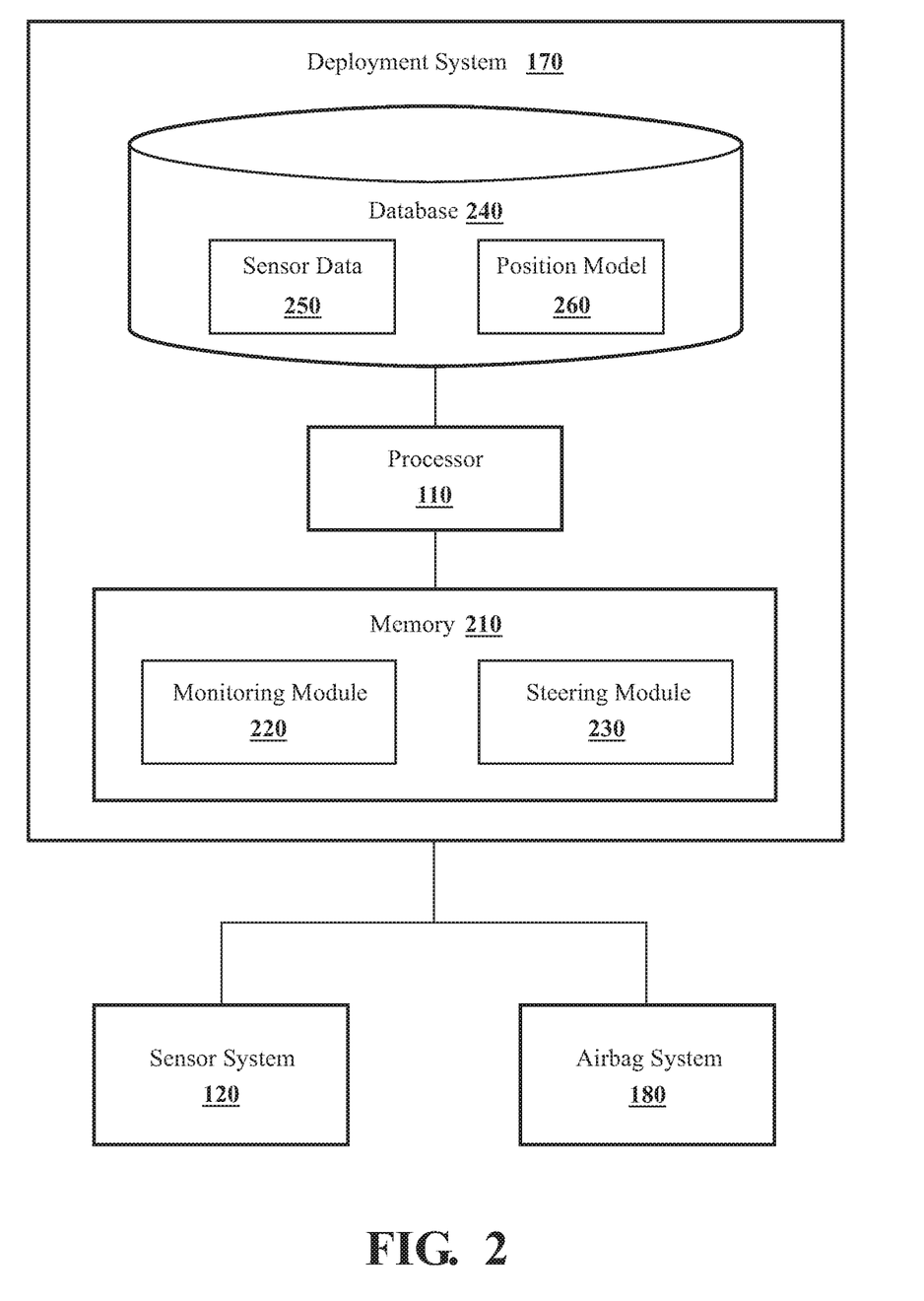
FIG. 2 illustrates one embodiment of a deployment system that is associated with improving deployment of an airbag by selectively controlling the rotation of a steering wheel to adjust hand placement of an operator.

With reference to FIG. 2, one embodiment of the deployment system 170 of FIG. 1 is further illustrated. The deployment system 170 is shown as including a processor 110 from the vehicle 100 of FIG. 1. Accordingly, the processor 110 may be a part of the deployment system 170, the deployment system 170 may include a separate processor from the processor 110 of the vehicle 100 or the deployment system 170 may access the processor 110 through a data bus or another communication path. In either case, the processor 110 is illustrated as part of the deployment system 170 for purposes of explanation. Additionally, in one embodiment, the deployment system 170 includes a memory 210 that stores a monitoring module 220 and a steering module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110, cause the processor 110 to perform the various functions disclosed herein.

Accordingly, in one embodiment, the monitoring module 220 generally includes instructions that function to control the processor 110 to acquire sensor data 250 from, for example, one or more sensors of the sensor system 120. In one embodiment, the sensor data 250 includes images from a camera 126 of an area within the vehicle 100 that includes at least the steering wheel. In further aspects, the monitoring module 220 controls multiple different cameras of the sensor system 120 located at various points in the vehicle 100 to acquire images. Moreover, in additional aspects, the monitoring module 220 can access sensor data 250 from and/or control further sensors of the sensor system 120 such as infrared cameras, capacitive touch sensors integrated into the steering wheel, pressure sensors within a seat of the operator, pressure sensors integrated into the steering wheel, and so on.

In either case, the monitoring module 220, monitors an electronic stream of sensor data 250 from the camera and/or other noted sensors to provide for capturing a position of the operator and a general orientation of at least the hands of the operator on the steering wheel. That is, in various aspects, the monitoring module 220 monitors not only the hands of the operator but a position of the operator's head, limbs, and so on around and on the steering wheel. Thus, the cameras may be situated within the vehicle 100 to not only capture a view of the steering wheel but also to capture areas surrounding the steering wheel including, for example, the dash, the operator's seat, a console area behind the steering wheel, and so on. In general, the monitoring module 220 can be configured in a manner so as to accept as many sources of information about the operator as may be useful in ascertaining how the operator is situated. In this way, the monitoring module 220 can determine not only when and where the operator's hands may be located on the steering wheel but also whether the operator's hands are proximate to the steering wheel (i.e., close but not touching), operating additional controls on the console behind the steering wheel, and so on. In this way, the monitoring module 220 can provide for determining hand positions for the operator even when the operator's hands are not in direct contact with the steering wheel.

Furthermore, the monitoring module 220 acquires the sensor data 250 and analyzes the sensor data 250 using one or more image recognition techniques (e.g., convolutional neural network) to identify aspects of the operator (e.g., hands, arms, head) and determine a particular orientation thereof. Additionally, the monitoring module 220 can further leverage sensor data 250 from the additional sources such as touch sensors in the steering wheel to supplement the determination of the operator's orientation.

Once the monitoring module 220 acquires the sensor data 250 and identifies the orientation of the operator (e.g., hand position), the steering module 230 can use the information about the operator to determine a mitigation action to implement should the airbag deploy. As an additional note, because the timing of detection of a potential collision and deployment of the airbag is, by the general nature of the circumstance, a quick action (e.g., less than a second), the monitoring module 220, in one embodiment, continuously acquires sensor data 250 about the operator and iteratively updates the orientation of the operator to reflect the most recent data. In further aspects, the monitoring module 220 can include data relating to movements and a current trajectory of different portions of the operator (e.g., hands, head, etc.) as a result of tracking the orientation in this manner and as an additional manner of improving the selection of a particular mitigation action.

In either case, the steering module 230 uses the orientation data to determine a particular mitigation action to undertake in case of the airbag being deployed. That is, commensurate with the present orientation of the operator, the steering module 230 dynamically determines a particular mitigation action to undertake in order to avoid injury to the operator should the airbag be deployed. The steering module 230 generally determines the mitigation action and stores the mitigation action for the present orientation of the operator in order to ensure that when the airbag is deployed, the mitigation action can be executed in a timely manner because of the short temporal window associated with deploying the airbag.

As a further matter prior to discussing additional aspects of the steering module 230, in one embodiment, the deployment system 170 includes a database 240. The database 240 is, for example, an electronic data structure stored in the memory 210 or another electronic data store and that is configured with routines that can be executed by the processor 110 for analyzing stored data, providing stored data, organizing stored data, and so on. Thus, in one embodiment, the database 240 stores data used/provided by the modules 220 and 230 in executing various functions. In one embodiment, the database 240 includes the sensor data 250 and a position model 260.

As will be discussed in further detail subsequently, the position model 260 is, in one embodiment, a lookup table that correlates current orientations of the operator with mitigation actions, a computational model that models the present orientation of the driver with associated mitigation actions, or another manner of correlating the mitigation actions with the orientation of the operator. Thus, the steering module 230 uses the orientation (e.g., hand position) as determined by the monitoring module 220 as an electronic input to the position model 260 to analyze the orientation of the operator and determine an appropriate mitigation action. Additionally, while the sensor data 250 and the position model 260 are illustrated as being stored within the database 240, it should be understood that in various embodiments the sensor data 250 and/or the position model 260 can be stored in the memory 210, integrated within one or more data structures of the monitoring module 220 and/or steering module 230, and so on.

In either case, the steering module 230 determines the appropriate mitigation action that correlates with the orientation of the operator and saves a code or other indicating value to a register for use when deployment of the airbag is imminent. As a general matter, the steering module 230 continuously monitors for a circumstance that indicates the deployment is imminent. The circumstance can take different forms depending on a particular implementation of the airbag system 180 and/or the deployment system 170;

however, in general, the steering module 230 monitors for an indication from a collision sensor, and/or module (e.g., autonomous driving module 160) that specifies the airbag is about to be deployed. Thus, the steering module 230 can directly receive an electronic signal that indicates the airbag is to be deployed or can sniff the electronic signal from a control line within the vehicle 100.

Accordingly, the steering module 230 reacts by controlling the steering wheel in a manner noted by the mitigation action. As previously indicated, the mitigation action can include different actions depending on the orientation of the operator. For example, the mitigation action can generally range from controlling the steering wheel to lock in a current position to rotating the steering wheel by a prescribed number of degrees and in a noted direction. By way of example, consider that the operator's hands are located at 12 o'clock (i.e., a top middle location) on the steering wheel. Because a volume of the airbag when deployed occupies that particular area and would thus deflect the operator's hands upward, this hand position is generally considered undesirable. Accordingly, the steering module 230 determines that an associated mitigation action is to control the steering wheel to rotate in a clockwise manner by at least ninety degrees such that the operator's hands are moved out of a path of the airbag.

As such, when the steering module 230 detects the imminent deployment of the airbag while the operator is in the noted position, the steering module 230 immediately controls the steering wheel to move in the noted manner. In this way, when or as the airbag is deployed the operator's hands are moved from a path of potential injury thereby improving deployment of the airbag. In further aspects, the mitigation action can include rotating the steering wheel anti-clockwise, locking the steering wheel, rotating the steering wheel at a particular rate, and so on. In general, the mitigation actions are implemented in such a way so as to minimize or at least attempt to minimize injury to the operator. Furthermore, it should be noted, that while the steering module 230 is discussed as controlling the steering wheel to rotate, in general, the steering module 230 controls the steering wheel without controlling a steering direction of the vehicle 100. Thus, the steering module 230 temporarily disconnects a response of the steering wheel from control of the wheels in order to permit the mitigation action to be executed without causing the vehicle 100 to steer in an erratic and likely undesirable manner.

Figure 3:
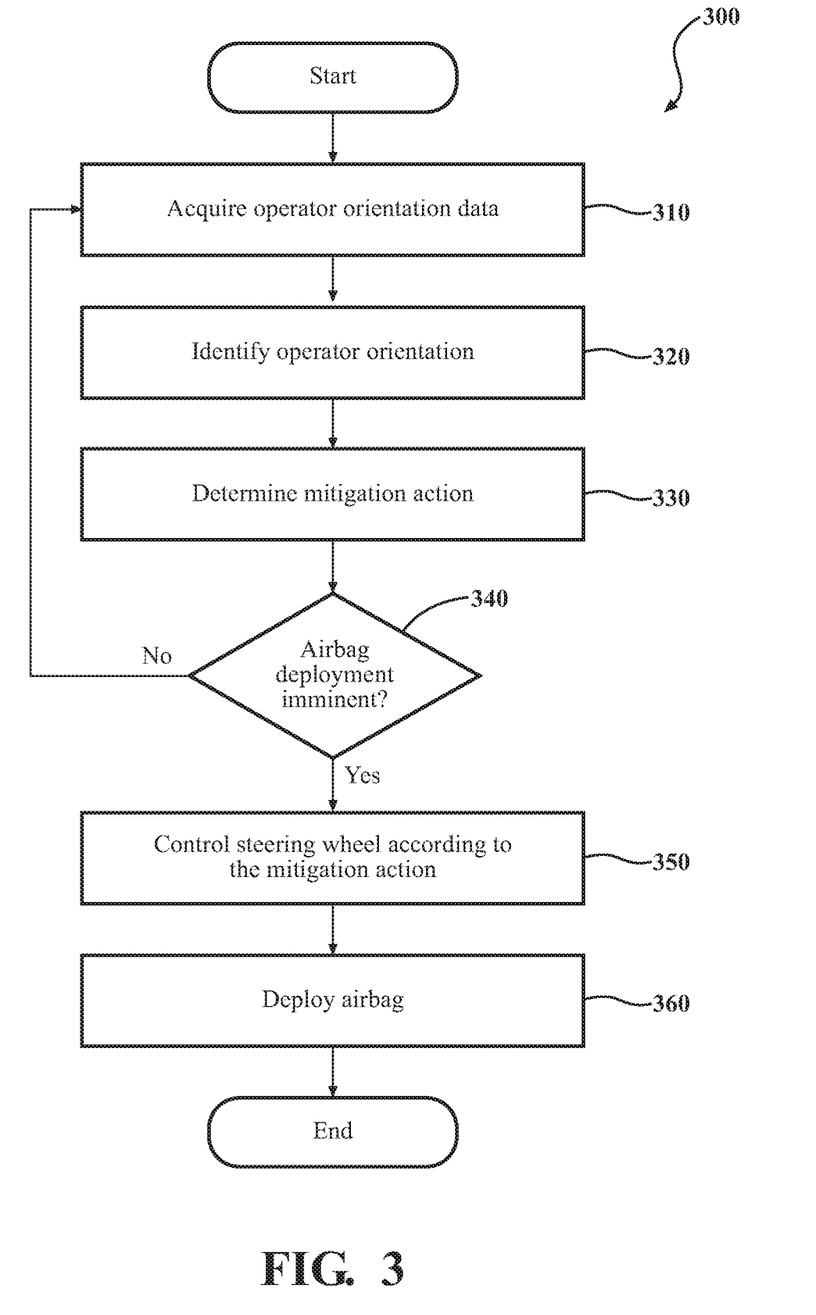
FIG. 3 illustrates one example of a method that is associated with selectively controlling a steering wheel of a vehicle according to an orientation of an operator when deploying an airbag.

Additional aspects of determining and executing mitigation actions for avoiding injuries from the deployment of an airbag will be discussed in relation to FIG. 3. FIG. 3 illustrates a flowchart of a method 300 that is associated with selectively controlling a steering wheel of a vehicle according to an orientation of an operator to avoid injuries during deployment of an airbag. Method 300 will be discussed from the perspective of the deployment system 170 of FIGS. 1 and 2. While method 300 is discussed in combination with the deployment system 170, it should be understood that the method 300 is not limited to being implemented within the deployment system 170, but is instead one example of a system that may implement the method 300.

At 310, the monitoring module 220 acquires orientation data (e.g., sensor data 250) about an operator of the vehicle 100. In general, the operator is an occupant of the vehicle 100 that is seated at the steering wheel. Accordingly, even though in various embodiments the vehicle 100 is an autonomous or semi-autonomous vehicle and thus may have only partial or no input from the operator, as used herein, operator refers to a particular one of the passengers that is seated in the noted configuration. Accordingly, the orientation data indicates observations of at least a hand position of the operator. That is, the orientation data includes information that is useful for determining a placement of the operator's hands in relation to the steering wheel.

Consequently, the monitoring module 220, in various aspects, acquires the orientation data (i.e., sensor data 250) from a camera (e.g., camera 126) that is mounted within a passenger compartment of the vehicle in such a manner so as to include at least the steering wheel within a field-of-view. In further aspects, the camera may include a wider field-of-view in order to acquire further information (e.g., arms, head, torso positions) about the orientation of the operator. Additionally, the monitoring module 220 may also acquire information from additional and/or alternative sensors such as touch sensors, pressure sensors, and so on located at various strategic points (e.g., on the steering wheel and/or other locations that the operator may place a hand) throughout the passenger compartment. In this way, the monitoring module 220 can determine hand position, body position, and/or arm position.

Thus, at 320, the monitoring module 220 identifies an orientation of the operator using the orientation data (e.g., sensor data). In one embodiment, the monitoring module 220 uses the orientation data as an electronic input to a lookup table. The lookup table is, for example, implemented as the position model 260 and includes a data structure that is indexed according to the orientation data with defined configurations of the hand position indicated within fields of the table. Alternatively, or additionally, in one embodiment, the monitoring module 220 analyzes the image(s) obtained from the camera(s) to identify respective hands of the operator and particular positions within the passenger compartment in relation to the steering wheel and a volume that is occupied by the airbag when the airbag is deployed. That is, the monitoring module 220 uses one or more image recognition techniques to discern various parts of the operator from the image and then determine a particular positioning of the parts (e.g., hands) within the interior of the vehicle 100 and specifically in relation to the steering wheel.

In various embodiments, the monitoring module 220 uses the images in addition to other sensor data from secondary sensors such as capacitive/pressure sensors within the steering wheel to improve a determination of hand position on the steering wheel. In either case, the monitoring module 220 iteratively determines the positioning of the operator in relation to the steering wheel to provide an up-to-date assessment in case of deployment of the airbag. It should be noted that while a plain positioning is discussed, the monitoring module 220, in further aspects, determines trajectories for the operator's hands when moving, which can then be used to further refine a particular mitigation action (e.g., maintaining a direction of travel instead of reversing the direction of travel for the operator's hands).

Additionally, the monitoring module 220, in one embodiment, can precisely determine placement of the hands and/or other body parts (e.g, arms) of the operator in order to discern a precise orientation of the operator. That is, the monitoring module 220 can determine which hand of the operator is located in which position, whether each hand is in contact with the steering wheel, an extent of pressure of each hand on the steering wheel, arm positions in relation to the steering wheel, and so on.

In further embodiments, the monitoring module 220 also compares the present position of the operator's hands and/or arms with a space within the passenger compartment that is consumed by a volume of the airbag when deployed. From this comparison, the monitoring module 220 can determine, in one embodiment, a particular positioning of the operator and whether the position is potentially impacted by the deployed airbag.

At 330, the steering module 230 determines, as a function of at least the hand position, a mitigation action associated with deploying the airbag. The steering module 230 can employ one or more approaches to determine the particular mitigation action. For example, in one embodiment, the steering module 230 uses the orientation/position information from block 320 as an electronic input to a lookup table that can be implemented within the position model 260. That is, the steering module 230 provides the orientation determination from 320 as an input to the lookup table to obtain the particular mitigation action.

In further aspects, the steering module 230 uses the orientation of the operator and additional data as an input to a neural network or other computational model embodied by the position model 260 in order to produce the mitigation action for the particular orientation. In either case, the mitigation action can indicate different controls for the steering wheel to avoid injury to the operator. For example, the mitigation action can indicate a direction of rotation, an extent of rotation, a rate of rotation, or to lock the steering wheel in a present configuration to avoid unwanted movement.

Thus, the steering wheel itself is operative to be controlled by the steering module 230 without changing a direction of the wheels of the vehicle 100. Accordingly, in one embodiment, the steering wheel includes a force feedback mechanism or other mechanical drive mechanism that can provide for moving the steering wheel in the noted manner.

At 340, the steering module 230 monitors for conditions indicating that the deployment of the airbag is imminent. In one embodiment, the steering module 230 monitors for an electronic airbag activation signal provided to the airbag system 180 from a collision sensor within the vehicle 100. In a further embodiment, the steering module 230 predicts whether an impact is likely that will result in the deployment of the airbag using sensor data from one or more environmental sensors of the vehicle 100. The steering module 230 can function in coordination with the autonomous driving module 160 to predict collisions or may include one or more models for analyzing the noted data and individually predicting collisions. In either case, when the steering module 230 determines that deployment of the airbag is not imminent, then the deployment system 170 continues by updating the orientation through reiterating blocks 310 to 340 as illustrated.

However, when deployment is determined to be imminent through one or more of the noted mechanisms, then the steering module 230 proceeds by, at 350, controlling the steering wheel according to the mitigation action. As previously indicated, the steering module 230 can control the steering wheel by rotating the steering wheel independently of wheels of the vehicle and without affecting a direction in which wheels of the vehicle are directed. The steering module 230 may also lock the steering wheel in a current position to avoid moving the operator's hands into a potentially dangerous orientation when the steering module 230 determines that the operator's hands are otherwise not at risk.

In either case, the steering module 230 generally executes the mitigation action in moments just before the airbag deploys or at least partially contemporaneously therewith. That is, because deployment of the airbag can be a highly time sensitive function, the steering module 230 may not be able to fully execute the mitigation action prior to the airbag deploying. Thus, in one embodiment, the steering module 230 immediately, upon determining deployment of the airbag is imminent, initiates the mitigation action. Consequently, even though the airbag may begin deploying as the mitigation action is occurring, the initiation of the mitigation action as noted provides at least partial mitigation of interference with a volume occupied by the airbag that may otherwise result in injury.

At 360, the airbag system 180 deploys the airbag. As previously noted, the deployment of the airbag may occur at least partially contemporaneously with the execution of the mitigation action. As a further matter, it should be noted that the functioning of the deployment system 170 does not alter how the airbag of the airbag system 180 is itself deployed. Instead, the deployment system performs the noted functions in order to supplement the operation of the airbag system 180 and facilitate improving safety in relation to deploying the airbag.

Figure 4:
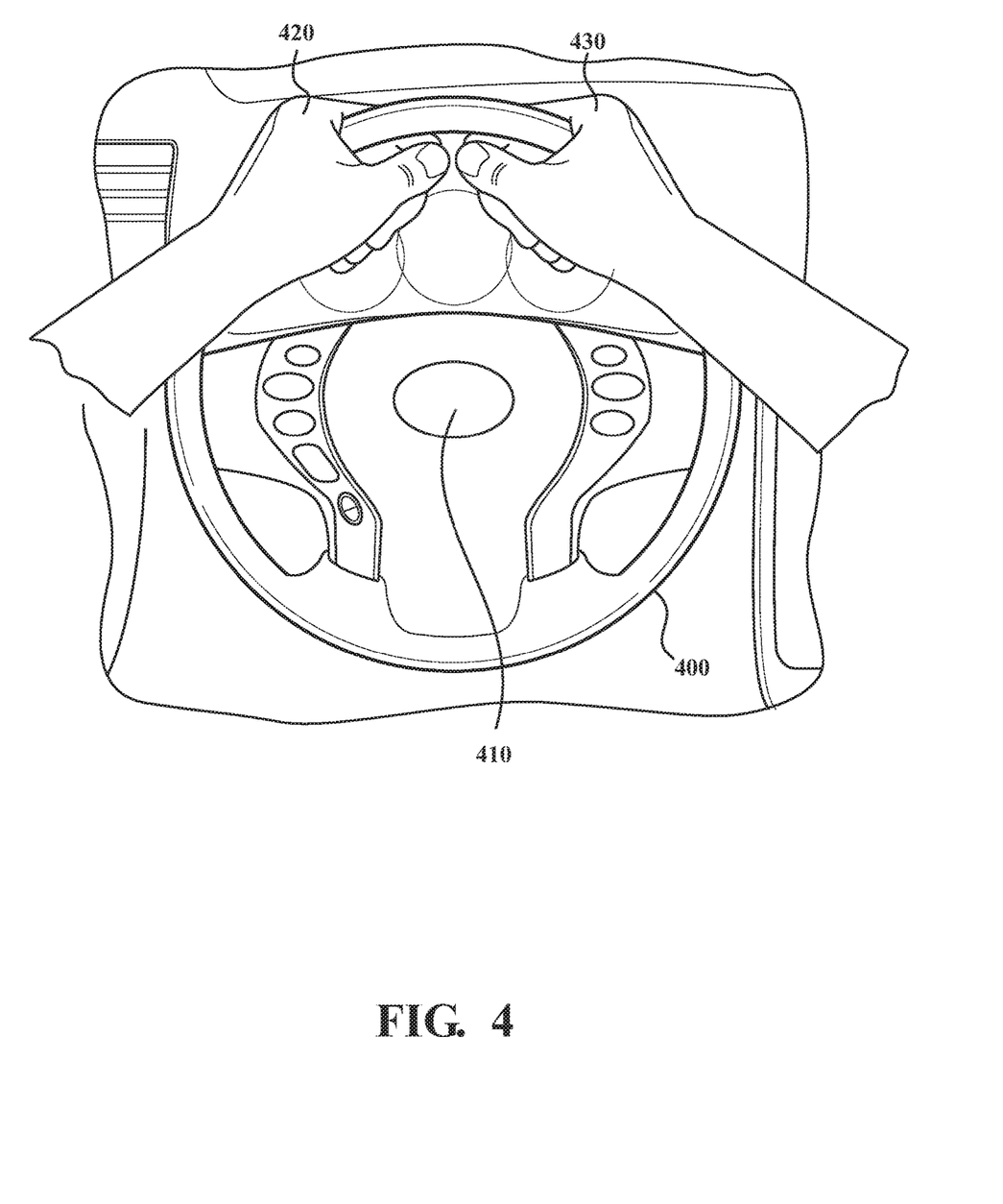
FIG. 4 is a diagram of a steering wheel including hands of an operator placed on the steering wheel.

Further aspects of the disclosed system and methods will be discussed with reference to FIGS. 4-6. FIG. 4 illustrates one example of a steering wheel 400 of the vehicle 100. As depicted in FIG. 4, the view of the steering wheel 400 represents one example of an image that may be captured by the camera 126 of the vehicle 100 when monitoring the orientation of the operator. The view depicted in FIG. 4 includes the steering wheel 400 with an undeployed airbag 410 located within a center area. Moreover, the operator's left hand 420 and right hand 430 are depicted at roughly a 12 o'clock position on the steering wheel 400. Thus, as a brief example of how the deployment system 170 may function, initially the monitoring module 220 acquires orientation data (e.g., sensor data 250) about the hands 420 and 430.

Thereafter, the monitoring module 220 analyzes the orientation data to discriminate between different aspects of the image by applying image recognition techniques to the acquired image(s), and/or a heuristic to further orientation data (e.g., touch sensor data). Consequently, the monitoring module 220 determines at least a hand position for each respective hand 420 and 430 of the operator. In the instant example, the monitoring module 220 provides an indication that the left and right hands are positioned as shown in FIG. 4. Thus, the steering module 230 uses the noted position to determine a mitigation action should the airbag deploy while the operator's hands 420 and 430 are located in the shown position. The mitigation action for the illustrated positioning can specify to rotate the steering wheel 400 in order to move the hands 420 and 430 away from the present positioning. A direction of rotation for the present hand position may be clockwise (e.g., toward an interior of the vehicle 100) in order to avoid moving the hands 420 and 430 toward a location of a potential impact (e.g., toward the door). However, it should be appreciated that the direction for the present hand position is otherwise not a critical aspect without knowing further information of the current circumstance.

Figure 5:
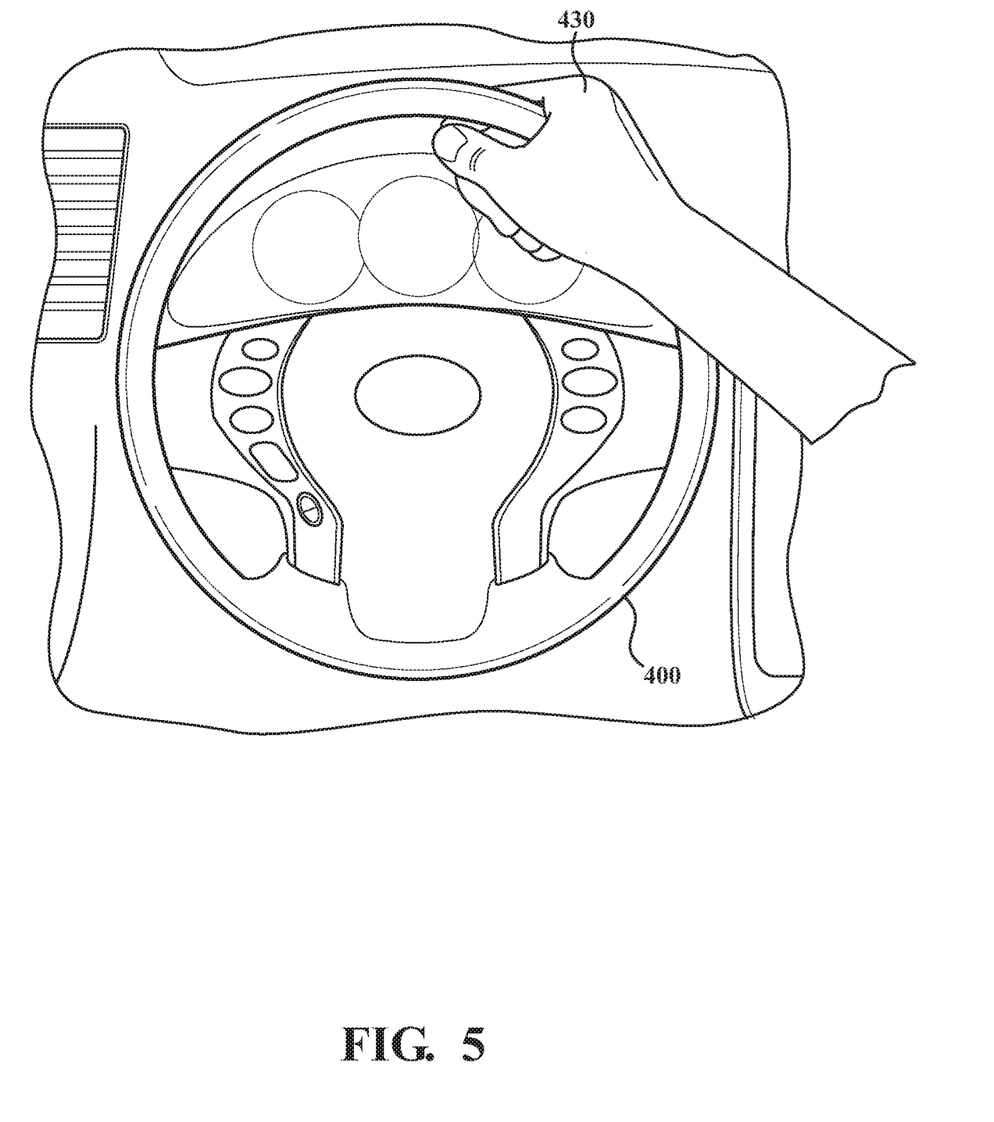
FIG. 5 is an additional diagram of a steering wheel including a hand of an operator placed on the steering wheel.

FIG. 5 illustrates an additional view of the steering wheel 400. In FIG. 5, the right hand 430 of the operator is positioned at about 12 o'clock on the steering wheel 400. Thus, the steering module 230, in one embodiment, determines that an appropriate mitigation action for this hand position is to rotate the steering wheel 400 clockwise by at least ninety degrees so that the right hand 430 is moved from a space that is to be occupied by a volume of the airbag 410 when deployed.

Figure 6:
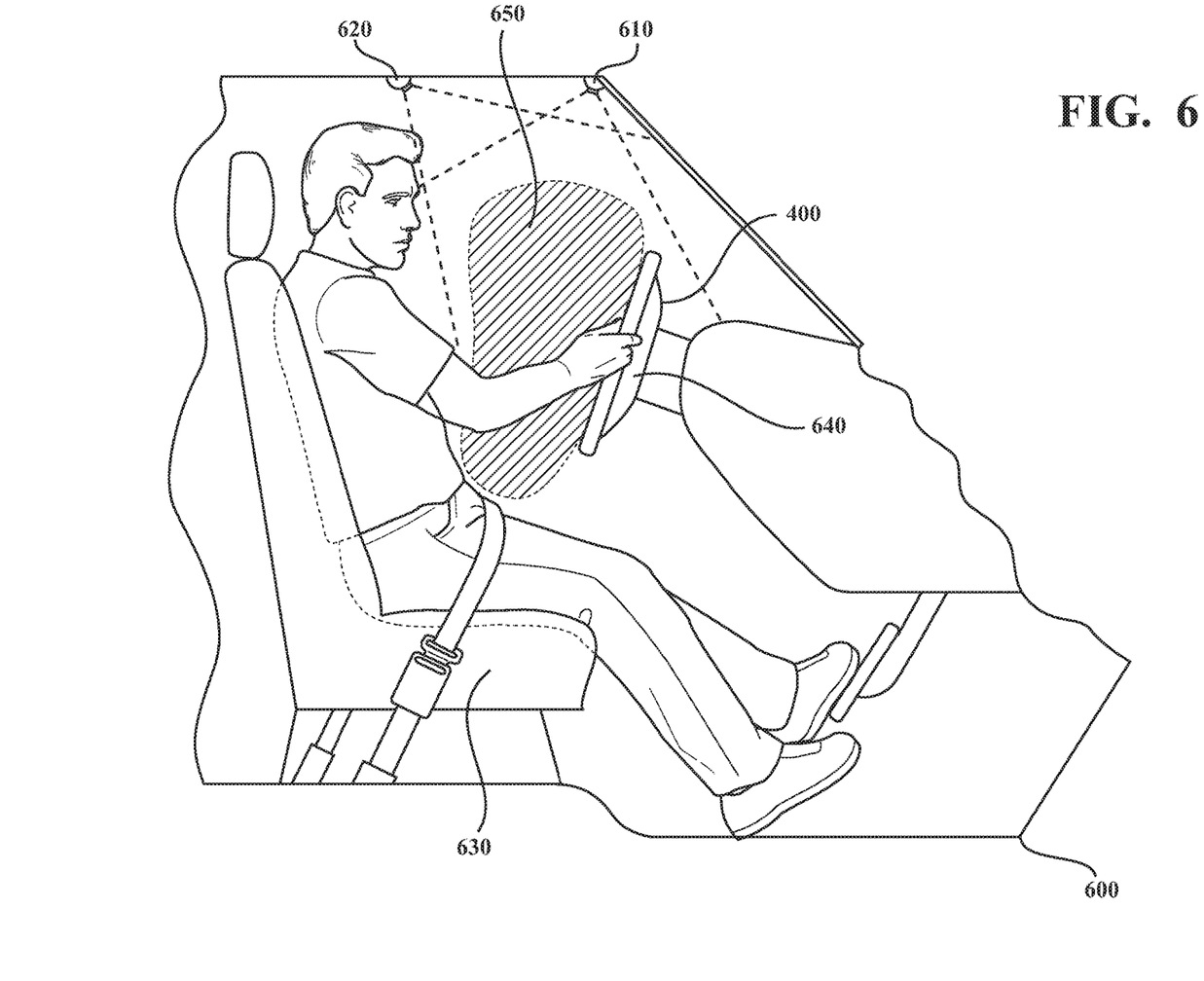
FIG. 6 is a side view of an interior of a passenger compartment of a vehicle illustrating a volume consumed by a deployed airbag.

FIG. 6 illustrates a side view of the passenger compartment 600. As illustrated in FIG. 6, the passenger compartment 600 includes cameras 610 and 620 that have separate fields-of-view which include the operator and the steering wheel 400. The passenger compartment 600 includes further sensors such as a seat pressure sensor 630 and a proximity sensor 640 embedded within the steering wheel 400. The sensors 630 and 640 provide additional information about the operator in order to further aspects of determining the orientation/positioning of the operator. Moreover, FIG. 6 also illustrates a volume 650 of the airbag 410 when deployed. The volume 650 illustrates space that is consumed by the airbag and how that space can impact hands/arms of the operator when deployed. As previously mentioned, the steering module 230 can account for the volume 650 when analyzing the orientation (e.g., hand position) of the operator in order to determine the mitigation action. In this way, the deployment system 170 can account for a particular orientation of the operator and facilitate avoiding injury to the operator during deployment.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human operator). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., operator) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. an operator or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the deployment system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the deployment system 170, and/or the autonomous driving module(s) 160 may control some or all of these vehicle systems 140 and, thus, may be partially or fully autonomous.

The processor(s) 110, the deployment system 170, and/or the autonomous driving module(s) 160 can be operatively connected to communicate with the various vehicle systems 140 and/or individual components thereof. For example, returning to FIG. 1, the processor(s) 110, the deployment system 170, and/or the autonomous driving module(s) 160 can be in communication to send and/or receive information from the various vehicle systems 140 to control the movement, speed, maneuvering, heading, direction, etc. of the vehicle 100. The processor(s) 110, the deployment system 170, and/or the autonomous driving module(s) 160 may control some or all of these vehicle systems 140.

The processor(s) 110, the deployment system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the deployment system 170, and/or the autonomous driving module(s) 160 can control the direction and/or speed of the vehicle 100. The processor(s) 110, the deployment system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). In one embodiment, the deployment system 170 can collect data about control signals from the processor 110 and the autonomous driving module 160 that cause the vehicle to accelerate, decelerate, and perform other various maneuvers and/or why the autonomous driving module 160 induced the maneuvers. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules described herein can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the deployment system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A deployment system for improving deployment of an airbag by controlling a steering wheel in a vehicle, comprising:
   one or more processors;
   a memory communicably coupled to the one or more processors and storing:
   a monitoring module including instructions that when executed by the one or more processors cause the one or more processors to identify at least a hand position for one or more hands of an operator on the steering wheel using orientation data acquired from at least one sensor of the vehicle; and
   a steering module including instructions that when executed by the one or more processors cause the one or more processors to determine, as a function of at least the hand position, a mitigation action associated with deploying the airbag including an extent of rotation, and a direction of rotation for the steering wheel to move the hands of the operator into a position that avoids contact with the airbag when the airbag is deployed,
   wherein the steering module further includes instructions to, in response to detecting that deployment of the airbag is imminent, control the steering wheel according to the mitigation action, and
   wherein the steering module includes instructions to i) determine the mitigation action including instructions to determine that the steering wheel is to be locked in a current position when the hand position of the operator indicates the hands are located outside of a volume to be occupied by the airbag when deployed, and ii) control the steering wheel including instructions to rotate the steering wheel independently of wheels of the vehicle and without affecting a direction in which the wheels are directed.

2. The deployment system of claim 1, wherein the monitoring module further includes instructions to acquire, using the at least one sensor that is within a passenger compartment of the vehicle, the orientation data that indicates observations of at least the hand position, wherein the at least one sensor is a camera that tracks the operator,
   wherein the monitoring module includes instructions to identify the hand position including instructions to analyze one or more images of the operator from the camera to determine which of the hands of the operator are in contact with the steering wheel and locations of the hands on the steering wheel.

3. The deployment system of claim 1, wherein the at least one sensor includes at least one of: a camera, a touch sensor integrated within the steering wheel, a pressure sensor within a seat of the operator, and
   wherein the orientation data includes information about a body position, arm position, and the hand position for the operator.

4. The deployment system of claim 1, wherein the steering module includes instructions to determine the mitigation action including instructions to determine a rate of rotation for the steering wheel to move the operator away from a volume to be occupied by the airbag when deployed.

5. The deployment system of claim 1, wherein the steering module includes instructions to detect that deployment of the airbag is imminent including instructions to perform one of: (i) detect an electronic airbag activation signal, and (ii) predict whether an impact is likely to result in deployment of the airbag according to sensor data from one or more environmental sensors of the vehicle.

6. The deployment system of claim 1, wherein the steering module further includes instructions to deploy the airbag after at least partially controlling the steering wheel according to the mitigation action, and
wherein the monitoring module includes instructions to iteratively execute the acquiring and analyzing of the orientation data to continually update a state of the hand position in anticipation of deploying the airbag.

7. The deployment system of claim 1, wherein the vehicle is operating at least semi-autonomously.

8. A non-transitory computer-readable medium storing for improving deployment of an airbag by controlling a steering wheel in a vehicle and including instructions that when executed by one or more processors cause the one or more processors to:
identify at least a hand position for one or more hands of an operator on the steering wheel using orientation data acquired from at least one sensor of the vehicle;
determine, as a function of at least the hand position, a mitigation action associated with deploying the airbag including an extent of rotation, and a direction of rotation for the steering wheel to move the hands of the operator into a position that avoids contact with the airbag when the airbag is deployed; and
in response to detecting that deployment of the airbag is imminent, control the steering wheel according to the mitigation action,
wherein the instructions to determine the mitigation action include instructions to determine that the steering wheel is to be locked in a current position when the hand position of the operator indicates the hands are located outside of a volume to be occupied by the airbag when deployed, and wherein the instructions to control the steering wheel include instructions to rotate the steering wheel independently of wheels of the vehicle and without affecting a direction in which the wheels are directed.

9. The non-transitory computer-readable medium of claim 8, wherein the instructions further include instructions to acquire, using the at least one sensor that is within a passenger compartment of the vehicle, the orientation data that indicates observations of at least the hand position, wherein the at least one sensor is a camera that tracks the operator, and
wherein the instructions to identify the hand position include instructions to analyze one or more images of the operator from the camera to determine which of the hands of the operator are in contact with the steering wheel and locations of the hands on the steering wheel.

10. The non-transitory computer-readable medium of claim 8, wherein the instructions to determine the mitigation action include instructions to determine a rate of rotation for the steering wheel to move the operator away from a volume to be occupied by the airbag when deployed.

11. The non-transitory computer-readable medium of claim 8, wherein the instructions further include instructions to deploy the airbag after at least partially controlling the steering wheel according to the mitigation action, and
wherein the instructions include instructions to iteratively execute the acquiring and analyzing of the orientation data to continually update a state of the hand position in anticipation of deploying the airbag.

12. A method of improving deployment of an airbag by controlling a steering wheel in a vehicle, comprising:
identifying at least a hand position for one or more hands of an operator on the steering wheel using orientation data acquired from at least one sensor of the vehicle;
determining, as a function of at least the hand position, a mitigation action associated with deploying the airbag including an extent of rotation, and a direction of rotation for the steering wheel to move the hands of the operator into a position that avoids contact with the airbag when the airbag is deployed; and
in response to detecting that deployment of the airbag is imminent, controlling the steering wheel according to the mitigation action,
wherein determining the mitigation action includes determining that the steering wheel is to be locked in a current position when the hand position of the operator indicates the hands are located outside of a volume to be occupied by the airbag when deployed, and
wherein controlling the steering wheel includes rotating the steering wheel independently of wheels of the vehicle and without affecting a direction in which the wheels are directed.

13. The method of claim 12, further comprising:
acquiring, using the at least one sensor that is within a passenger compartment of the vehicle, the orientation data that indicates observations of at least the hand position, wherein the at least one sensor is a camera that tracks the operator, and
wherein identifying the hand position includes analyzing one or more images of the operator from the camera to determine which of the hands of the operator are in contact with the steering wheel and locations of the hands on the steering wheel.

14. The method of claim 12, wherein the at least one sensor includes at least one of: a camera, a touch sensor integrated within the steering wheel, and a pressure sensor within a seat of the operator, and
wherein the orientation data includes information about a body position, arm position, and the hand position for the operator.

15. The method of claim 12, wherein determining the mitigation action includes determining a rate of rotation for the steering wheel to move the operator away from a volume to be occupied by the airbag when deployed, and
wherein determining the extent of rotation includes determining degrees by which to rotate the steering wheel to move the hands away from the volume and from being propelled into the operator.

16. The method of claim 12, wherein detecting that deployment of the airbag is imminent includes one of: (i) detecting an electronic airbag activation signal, and (ii) predicting an impact that is likely to result in deployment according to sensor data from one or more environmental sensors of the vehicle.

17. The method of claim 12, further comprising:
deploying the airbag after at least partially controlling the steering wheel according to the mitigation action, wherein the acquiring and analyzing of the orientation data occurs iteratively to continually update a state of the hand position in anticipation of deploying the airbag.

* * * * *

UNITED STATES PATENT AND TRADEMARK OFFICE
CERTIFICATE OF CORRECTION

PATENT NO. : 10,577,008 B2  
APPLICATION NO. : 15/787866  
DATED : March 3, 2020  
INVENTOR(S) : James Cazzoli Page 1 of 1

It is certified that error appears in the above-identified patent and that said Letters Patent is hereby corrected as shown below:

On the Title Page

ABSTRACT Line 1:
Change "System" to "Systems"

In the Claims

Column 18, Line 51 Claim 2:
Add "and" after "...the operator,"

Column 19, Line 20 Claim 8:
Delete "storing"

Signed and Sealed this  
Twenty-third Day of June, 2020

Andrei Iancu  
*Director of the United States Patent and Trademark Office*